United States Patent
Komatsuzaki et al.

(10) Patent No.: US 9,917,748 B2
(45) Date of Patent: Mar. 13, 2018

(54) INFORMATION PROCESSING APPARATUS AND INFORMATION PROCESSING METHOD FOR PRESENTATION OF INFORMATION BASED ON STATUS OF USER DEVICE

(71) Applicant: Sony Corporation, Tokyo (JP)

(72) Inventors: Yoriko Komatsuzaki, Tokyo (JP); Hiroki Nagahama, Tokyo (JP)

(73) Assignee: Sony Corporation, Tokyo (JP)

(*) Notice: Subject to any disclaimer, the term of this patent is extended or adjusted under 35 U.S.C. 154(b) by 247 days.

(21) Appl. No.: 13/867,196

(22) Filed: Apr. 22, 2013

(65) Prior Publication Data

US 2013/0290523 A1 Oct. 31, 2013

(30) Foreign Application Priority Data

Apr. 26, 2012 (JP) ................. 2012-100680

(51) Int. Cl.
*G06F 15/173* (2006.01)
*H04L 12/26* (2006.01)
*H04W 4/18* (2009.01)
*H04L 29/08* (2006.01)
*H04W 52/02* (2009.01)

(52) U.S. Cl.
CPC .............. *H04L 43/04* (2013.01); *H04L 43/08* (2013.01); *H04L 67/303* (2013.01); *H04W 4/18* (2013.01); *H04W 52/0261* (2013.01); *Y02B 60/50* (2013.01)

(58) Field of Classification Search
CPC ........ H04L 43/04; H04L 43/08; H04L 67/303; H04W 4/18; H04W 52/0261
See application file for complete search history.

(56) References Cited

U.S. PATENT DOCUMENTS

| | | | |
|---|---|---|---|
| 6,721,804 B1* | 4/2004 | Rubin | G06F 17/30873 707/E17.111 |
| 9,020,571 B2* | 4/2015 | Chi | H04B 1/38 455/566 |
| 2002/0027541 A1* | 3/2002 | Cairns | G09G 3/3611 345/87 |
| 2002/0143975 A1* | 10/2002 | Kimura et al. | 709/231 |
| 2004/0203851 A1* | 10/2004 | Vetro | H04L 29/06 455/456.1 |
| 2005/0108687 A1* | 5/2005 | Mountain et al. | 717/127 |
| 2008/0253330 A1* | 10/2008 | Bartlett | 370/331 |
| 2009/0096772 A1* | 4/2009 | Kinoshita | G09G 3/22 345/204 |

(Continued)

*Primary Examiner* — Dhairya A Patel
(74) *Attorney, Agent, or Firm* — Chip Law Group

(57) ABSTRACT

There is provided an information processing apparatus, including an acquiring unit that acquires first information representing at least one of a characteristic and a status of delivery data and second information representing at least one of a characteristic and a status of a terminal in which the delivery data is usable, a comparing unit that compares the first information and the second information acquired by the acquiring unit, and determines whether or not the delivery data is usable in the terminal, and a presentation information generating unit that generates information of the delivery data usable in the terminal based on a determination result of the comparing unit as presentation information.

13 Claims, 12 Drawing Sheets

(56) References Cited

U.S. PATENT DOCUMENTS

| | | | |
|---|---|---|---|
| 2009/0164152 A1* | 6/2009 | Creus | G06F 1/3203 702/63 |
| 2009/0278506 A1* | 11/2009 | Winger | H02J 7/0068 320/160 |
| 2010/0094931 A1* | 4/2010 | Hosur et al. | 709/203 |
| 2010/0174928 A1* | 7/2010 | Borghetti et al. | 713/320 |
| 2010/0333137 A1* | 12/2010 | Hamano et al. | 725/39 |
| 2011/0002344 A1* | 1/2011 | Palin | H04L 47/10 370/428 |
| 2011/0032324 A1* | 2/2011 | George | G06F 1/3203 348/14.12 |
| 2011/0137592 A1* | 6/2011 | Kim | G01R 21/1338 702/62 |
| 2011/0161514 A1* | 6/2011 | Voutilainen | H04L 69/04 709/231 |
| 2011/0288381 A1* | 11/2011 | Bartholomew | A61B 5/024 600/301 |
| 2013/0012268 A1* | 1/2013 | Whang | G06F 3/04895 455/563 |
| 2013/0152175 A1* | 6/2013 | Hromoko | H04W 36/0011 726/5 |
| 2013/0208587 A1* | 8/2013 | Bala | H04W 16/14 370/230 |

\* cited by examiner

FIG. 9
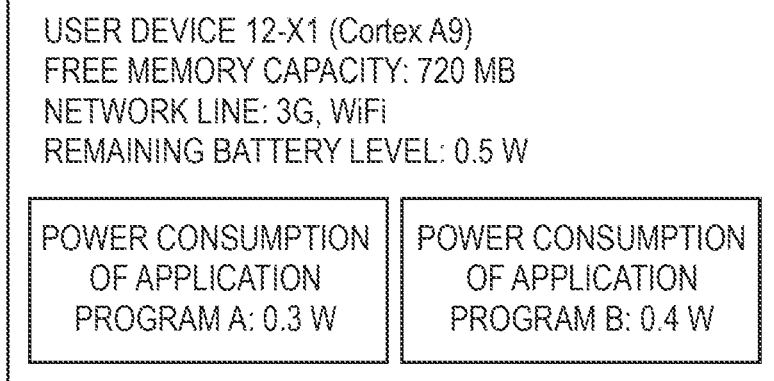
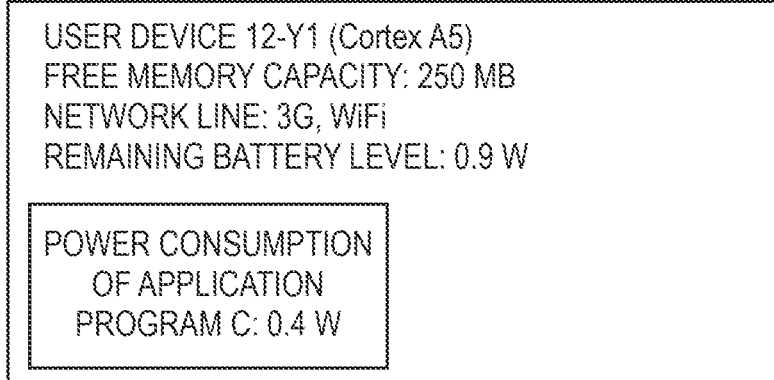
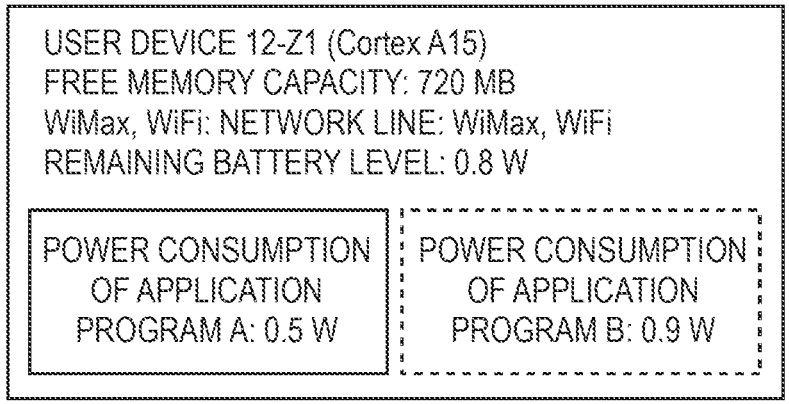

INFORMATION PROCESSING APPARATUS AND INFORMATION PROCESSING METHOD FOR PRESENTATION OF INFORMATION BASED ON STATUS OF USER DEVICE

BACKGROUND

The present technology relates to an information processing apparatus and method, a program, and an information processing system, and more particularly, to an information processing apparatus and method, a program, and an information processing system which are capable of appropriately controlling presentation of a use application program and content according to a status of a user device of a provision destination.

In the past, when a user has desired to use an application program or content, the user has operated his/her own device (hereinafter referred to as a "user device") to access a service providing site or the like on a web. In this case, many downloadable application programs or content are presented on the user device. At this time, the user operates the user device to designate a desired application program or content from among displayed application programs or content, and downloads the desired application program or content to the user device. Then, the user can use the application program or the content using the user device (for example, see Japanese Unexamined Patent Application Publication (Translation of PCT Application) No. 2008-512734).

SUMMARY

However, there are cases in which after an application program or content is provided from the service providing site to the user device, the application program or the content is found to be unusable on the user device.

For example, when a technique discussed in Japanese Unexamined Patent Application Publication (Translation of PCT Application) No. 2008-512734 is applied, at the time of reproduction of content, a difference in a format according to a user device is considered, but a status of the user device is not considered. For this reason, multimedia content provided to the user device may be irreproducible depending on the status of the user device.

It is desirable to provide a technology capable of appropriately controlling presentation of a use application program and content according to a status of a user device of a provision destination.

According to an embodiment of the present disclosure, there is provided an information processing apparatus, including an acquiring unit that acquires first information representing at least one of a characteristic and a status of delivery data and second information representing at least one of a characteristic and a status of a terminal in which the delivery data is usable, a comparing unit that compares the first information and the second information acquired by the acquiring unit, and determines whether or not the delivery data is usable in the terminal, and a presentation information generating unit that generates information of the delivery data usable in the terminal based on a determination result of the comparing unit as presentation information.

The delivery data may include at least one of an application program and content.

The first information acquired by the acquiring unit may include power consumption estimation information used to estimate power consumption when the delivery data is used in the terminal, and the information processing apparatus may further include a power consumption estimating unit that estimates power consumption when the delivery data is used in the terminal based on the power consumption estimation information included in the first information acquired by the acquiring unit and the second information.

The power consumption estimation information may include a type of a device which is likely to be mounted in the terminal and use information representing a degree of resource use of the device of the type when the delivery data is used, the second information may include a type of a device mounted in the terminal and relation information representing a relation between the degree of resource use of the device of the type and individual power consumption, and the power consumption estimating unit may estimate the power consumption by estimating the individual power consumption consumed in each of the devices of the type mounted in the terminal based on the use information and the relation information and adding the individual power consumption of the respective devices of the type.

The comparing unit may compare the power consumption estimated by the power consumption estimating unit with a remaining battery level included in the second information, and determines whether or not the delivery data is usable in the terminal using at least a comparison result.

The comparing unit may compare a type of a CPU capable of executing the delivery data included in the first information with a type of a CPU included in the second information, and determines whether or not the delivery data is usable in the terminal using at least a comparison result.

The comparing unit may compare a footprint at the time of operation when the delivery data is used which is included in the first information with a free memory capacity included in the second information, and determines whether or not the delivery data is usable in the terminal using at least a comparison result.

The comparing unit may compare a communication path used by the delivery data which is included in the first information with a network line included in the second information, and determines whether or not the delivery data is usable in the terminal using at least a comparison result.

The presentation information generating unit may generate information of the delivery data usable in the terminal and information including the power consumption estimated by the power consumption estimating unit as the presentation information.

The presentation information may be information of a list form.

The information processing apparatus may further include a format supporting unit that converts a format of the delivery data determined to be unusable in the terminal by the comparing unit into a format usable in the terminal so that the delivery data is supported by the terminal. The presentation information generating unit may generate the presentation information including information of the delivery data whose format is converted by the format supporting unit.

The information processing apparatus may further include a format supporting unit that searches for another application program or content as an alternative to the delivery data determined to be unusable in the terminal by the comparing unit. The presentation information generating unit may generate the presentation information including information of the other application program or content searched as the alternative to the delivery data by the format supporting unit.

An image processing method and program according to the embodiment of the present disclosure are the method and program corresponding to the image processing apparatus according to the embodiment of the present disclosure.

According to an embodiment of the present disclosure, there is provided an information processing method and a program, including acquiring first information representing at least one of a characteristic and a status of delivery data and second information representing at least one of a characteristic and a status of a terminal in which the delivery data is usable, comparing the acquired first information with the second information and determining whether or not the delivery data is usable in the terminal, and generating information of the delivery data usable in the terminal based on a determination result as presentation information.

According to an embodiment of the present disclosure, there is provided an information processing system including a server capable of delivering an application program and content and a user terminal using a target delivered from the server from the application program and the content, the information processing system including an acquiring unit that acquires first information representing at least one of a characteristic and a status of delivery data and second information representing at least one of a characteristic and a status of a terminal in which the delivery data is usable when at least one of the application program and the content is set as the delivery data in the server, a comparing unit that compares the first information and the second information acquired by the acquiring unit, and determines whether or not the delivery data is usable in the terminal, and a presentation information generating unit that generates information of the delivery data usable in the terminal based on a determination result of the comparing unit as presentation information.

In an information processing system according to an aspect of the present technology, a server delivers an application program and content, a user terminal uses a target delivered from the server from the application program and the content, first information representing at least one of a characteristic and a status of delivery data and second information representing at least one of a characteristic and a status of a terminal in which the delivery data is usable are acquired when at least one of the application program and the content is set as the delivery data in the server, the acquired first information is compared with the second information, and it is determined whether or not the delivery data is usable in the terminal, and information of the delivery data usable in the terminal is generated based on a determination result as presentation information.

According to the embodiments of the present disclosure described above, it is possible to appropriately control presentation of a use application program and content according to a status of a user device of a provision destination.

BRIEF DESCRIPTION OF THE DRAWINGS

FIG. 9 is a diagram illustrating presentation information in a user device;

DETAILED DESCRIPTION OF THE EMBODIMENT(S)

Figure 1:
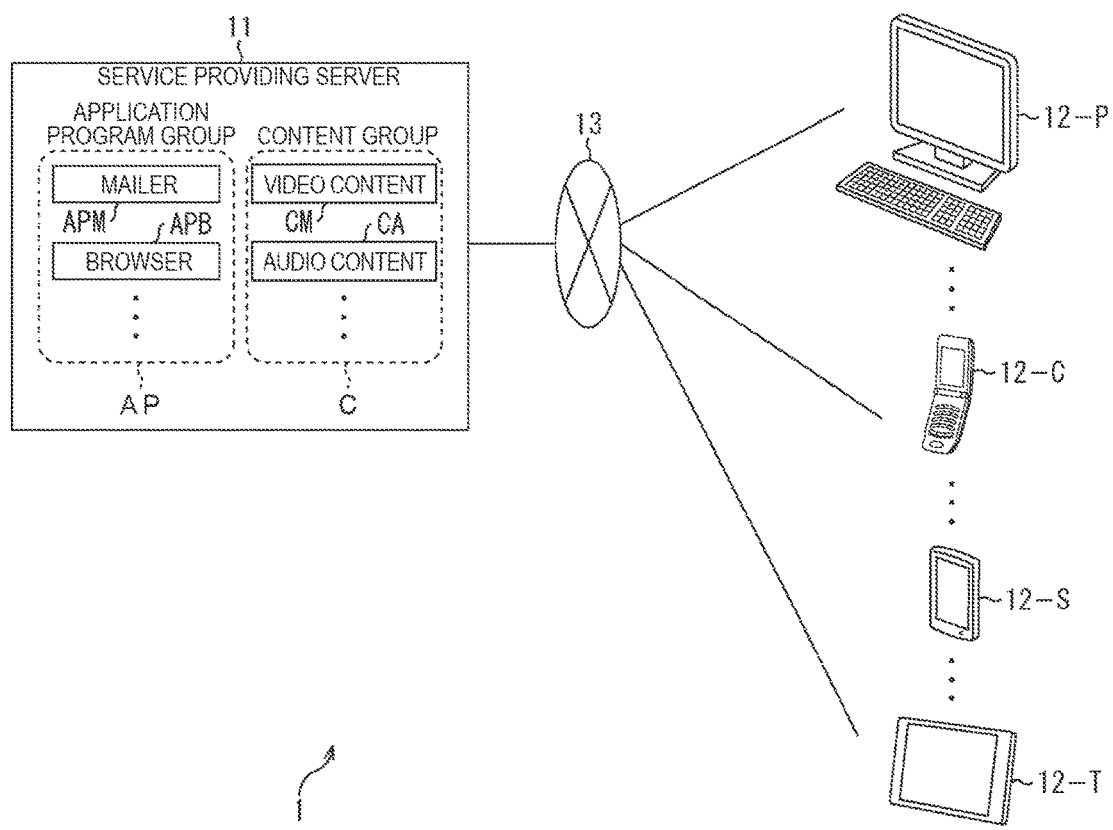
FIG. 1 illustrates a configuration example of an information processing system to which the present technology is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Configuration Example of Information Processing System]

FIG. 1 illustrates a configuration example of an information processing system 1 to which the present technology is applied.

In the example of FIG. 1, the information processing system 1 is configured such that a service providing server 11 is connected with four types of user devices 12-P, 12-C, 12-S, and 12-T via a network 13. The number or the types of user devices are not limited to the example of FIG. 1, and may be arbitrary.

The service providing server 11 provides the user with an application program or content with or without a fee. The service providing server 11 is, for example, an application program store, a content store, an application program market, a cloud service, a content server, or the like.

The service providing server 11 holds various kinds of application programs such as a mailer APM and a browser APB in a downloadable manner as an application program group AP to be provided to the user. Further, the service providing server 11 holds various kinds of content such as video content CM, audio content CA, and game content in a downloadable manner as a content group C to be provided to the user.

Each of the user devices 12-P, 12-C, 12-S, and 12-T is configured as a personal computer, a mobile phone, a smart phone, or a tablet terminal, and, for example, downloads, and performs execution, reproduction, etc. (hereinafter referred to as "use") of an application program and content. The user devices 12-P, 12-C, 12-S, and 12-T are collectively referred to as a "user device 12" when they need not be individually discriminated.

In response to the user's operation, the user device 12 accesses the service providing server 11 and downloads an application program or content desired by the user. Then, the user can use the downloaded application program or content using the user device 12.

In the information processing system 1, the service providing server 11 sets at least one of available application programs and content as delivery data, and determines whether or not the application program or content of the delivery data is usable in the user device 12 based on a characteristic and a status of the delivery data and a characteristic and a status of the accessed user device 12.

Then, the service providing server 11 presents an application program or content determined to be usable in the user device 12 among the delivery data to the user device 12.

In addition, for example, the service providing server 11 converts a format of an application program or content determined to be unusable in the user device 12 into a format usable in the user device 12 and presents the converted application program or content or presents another application program or content having an equivalent function as an alternative.

Thus, regardless of what application program or content presented by the service providing server 11 is selected and downloaded by the user, the application program or content can be used in the user device 12.

In addition, the service providing server 11 estimates necessary power when an application program or content presented to the user device 12 is used by the user device 12. Then, the service providing server 11 presents the estimated power together when presenting an application program or content determined to be usable in the user device 12.

Thus, the user can be informed of power consumption in the user device 12 for the presented application program or content before use. Thus, the user can select an application program or content of low power consumption from among application programs or content presented from the service providing server 11, and can consequently save power of the user device 12. Particularly, this function is suitable for the user device 12 of a portable type operating by a battery.

In the process which is described above to be executed at the service providing server 11 side, that is, the process of determining whether an application program or content is usable in the user device 12, the execution location is not particularly limited to the above example, and may be the user device 12 or arbitrary.

For example, the user device 12 may determine whether or not each application program or piece of content is usable in the user device 12 based on a characteristic or status of an own device and a characteristic or status of an application program or content set as delivery data by the service providing server 11. In this case, the user device 12 presents an application program or content determined to be usable.

In addition, for example, the user device 12 converts a format of an application program or content determined to be unusable into a format usable in the user device 12 and presents the converted application program or content or presents another application program or content having an equivalent function as an alternative.

In addition, the user device 12 may estimate necessary power when the presented application program or content is used by the user device 12, and present the estimated power together.

[Hardware Configuration Example of Service Providing Server]

Figure 2:
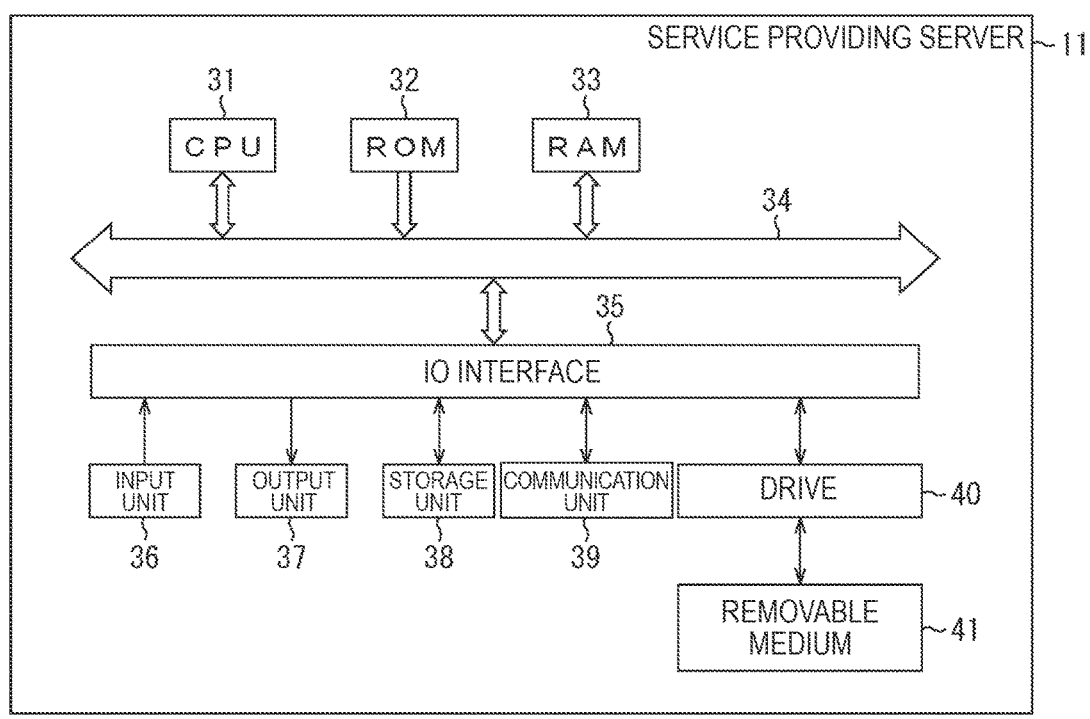
FIG. 2 is a block diagram illustrating a configuration example of hardware of a service providing server.

FIG. 2 is a block diagram illustrating a configuration example of hardware of the service providing server 11.

The service providing server 11 includes a central processing unit (CPU) 31, a read only memory (ROM) 32, a random access memory (RAM) 33, a bus 34, an input output (IO) interface 35, an input unit 36, an output unit 37, a storage unit 38, a communication unit 39, and a drive 40.

The CPU 31 executes various kinds of processes according to a program recorded in the ROM 32. Alternatively, the CPU 31 executes various kinds of processes according to a program loaded in the RAM 33 from the storage unit 38. The RAM 33 appropriately stores data necessary for the CPU 31 to execute various kinds of processes.

The CPU 31, the ROM 32, and the RAM 33 are connected to one another via the bus 34. Further, the IO interface 35 is connected to the bus 34. The input unit 36, the output unit 37, the storage unit 38, and the communication unit 39 are connected to the TO interface 35.

The input unit 36 includes a keyboard, a mouse, a microphone, and the like. The output unit 37 includes a display, a speaker, and the like, and outputs various kinds of images.

For example, the storage unit 38 is configured with a hard disk, a non-volatile memory, or the like, and stores a variety of information such as an application program or content and a characteristic or status thereof. A characteristic or status of an application program or content will be described later.

The communication unit 39 controls communication performed between the user device 12 via the network 13 including the Internet.

The drive 40 is connected to the TO interface 35 as necessary, and a removable medium 41 such as a magnetic disk, an optical disc, a magnetic optical disc, or a semiconductor memory is appropriately mounted to the TO interface 35. Further, a computer program read from the removable medium 41 is installed in the storage unit 38 as necessary.

[Hardware Configuration Example of User Device]

Figure 3:
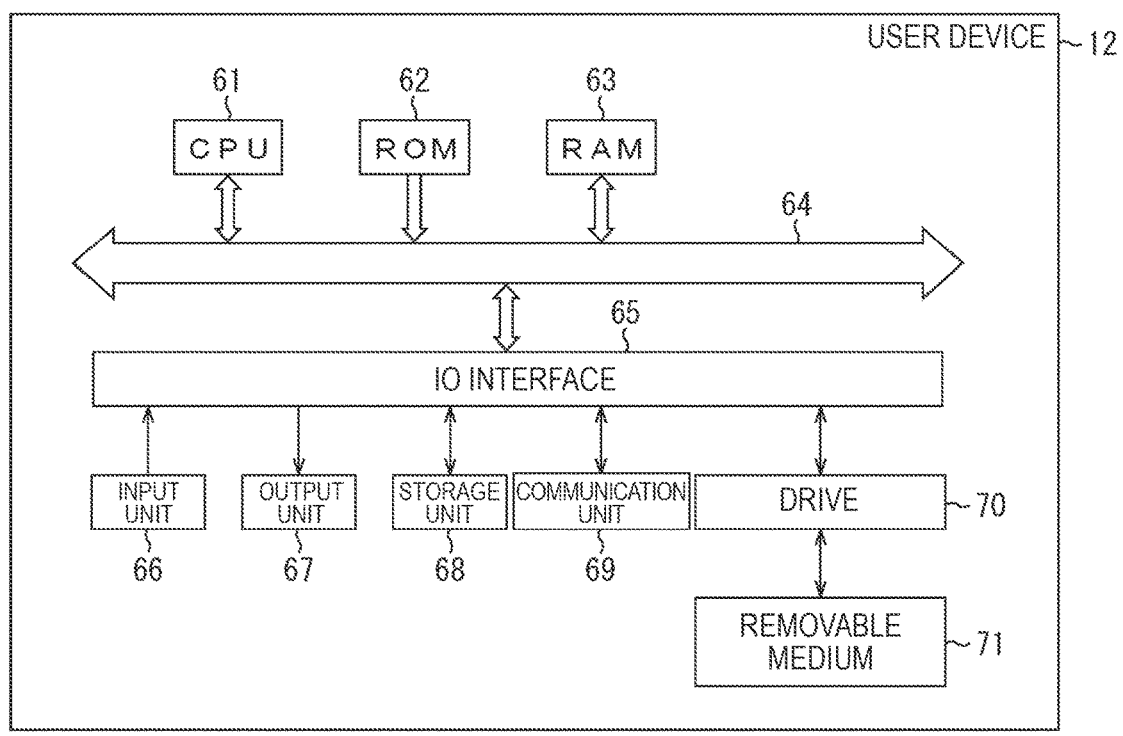
FIG. 3 is a block diagram illustrating a configuration example of hardware of a user device.

FIG. 3 is a block diagram illustrating a configuration example of hardware of the user device 12.

The user device 12 includes a CPU 61, a ROM 62, a RAM 63, a bus 64, an TO interface 65, an input unit 66, an output unit 67, a storage unit 68, a communication unit 69, and a drive 70.

The user device 12 is basically similar in configuration to the service providing server 11 of FIG. 2. The same portions as in the service providing server 11 of FIG. 2 will not be described below, and the description will proceed with different points.

For example, the storage unit 68 is configured with a hard disk, a non-volatile memory, or the like, and stores a variety of information such as a characteristic or status of the user device 12. The characteristic and the status of the user device 12 will be described later.

The communication unit 69 controls communication with various kinds of devices, for example, the service providing server 11, on the network 13 including the Internet via a predetermined network line. The network line is, for example, a mobile communication line such as a third or fourth generation mobile communication system (3G or 4G), Long Term Evolution (LTE), or Worldwide Interoperability for Microwave Access (WiMAX), a wireless network line such as Wi-Fi, Bluetooth, or an infrared ray, and a wired network line, and includes all network lines.

Further, a form of provision of an application program or content from the service providing server 11 to the user device 12 is not limited to a technique using the communication unit 69. For example, a technique in which an application program or content stored in a storage such as an SD card, a memory stick, or a universal serial bus is copied to the user device 12 is also included.

The hardware configurations of the service providing server 11 and the user device 12 have been described above. Next, functional configurations of the service providing server 11 and the user device 12 will be described.

[Functional Configuration Example of Service Providing Server]

Figure 4:
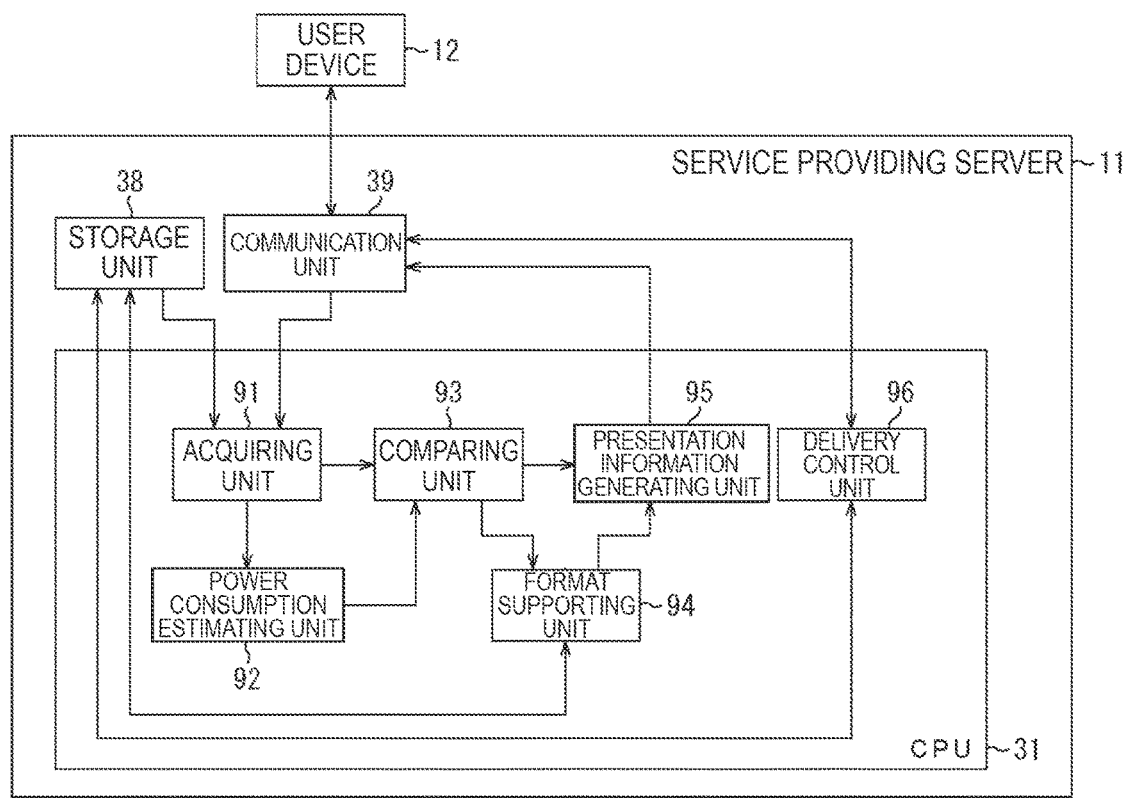
FIG. 4 is a block diagram illustrating a functional configuration example of a CPU of a service providing server.

FIG. 4 is a block diagram illustrating a functional configuration example of the CPU 31 of the service providing server 11 illustrated in FIG. 2.

The CPU 31 includes an acquiring unit 91, a power consumption estimating unit 92, a comparing unit 93, a format supporting unit 94, a presentation information generating unit 95, and a delivery control unit 96.

The acquiring unit 91 acquires a characteristic or status of an application program or content stored in the storage unit 38 when there is access by the user device 12. Further, the acquiring unit 91 acquires a characteristic or status of the user device 12 having access through the communication unit 39.

Here, a characteristic or status of an application program or content stored in the storage unit 38 will be described.

A characteristic or status of an application program or content includes, for example, the type or performance of a CPU capable of executing a corresponding application program or content, the size of a corresponding application program or content, a footprint at the time of operation, and a communication path to be used. A characteristic or status of an application program or content further includes, for example, age information of the user who is allowed to use a corresponding application program or content. A characteristic or status of an application program or content further includes information (hereinafter referred to as "power consumption estimation information") for estimating power consumption when a corresponding application program or content is used by the user device 12.

Here, the power consumption estimation information will be described with reference to FIG. 5.

[Power Consumption Estimation Information]

Figure 5:
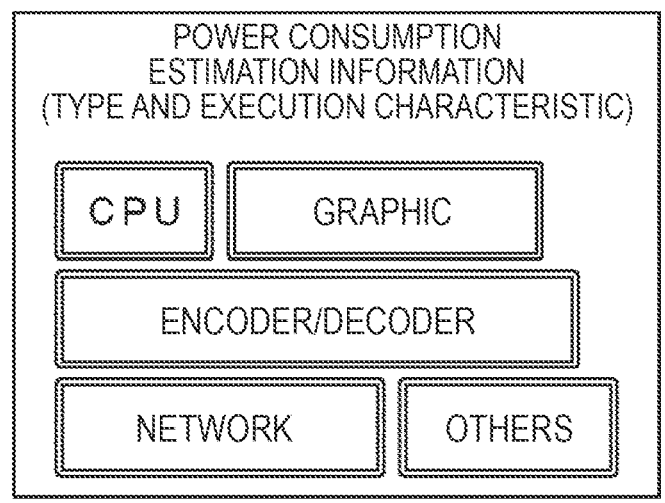
FIG. 5 is a diagram illustrating power consumption estimation information.

FIG. 5 is a diagram illustrating power consumption estimation information.

The power consumption estimation information includes information (hereinafter referred to as an "execution characteristic") representing a device type which is the type of a device which is mountable in the user device 12 and what amount of resources of each device indicated according to the type of device a corresponding application program or content uses when an application program or content is used.

As the device type, a CPU, a graphic device, an encoder, a decoder, a network, and any other device type which is likely to be mounted in the user device 12 are indicated. In any other device type, for example, a storage is included as the type of device mounted in the user device 12.

Further, as the execution characteristic, information representing what amount of resources of each of a plurality of devices indicated by the device type an application program or content uses when a corresponding application program or content is used by the user device 12. For example, the execution characteristic is information representing that 1 MIPS of a CPU is used, and 10 Mbps of a band of a network is used when a predetermined application or content is used by the user device 12.

The power consumption estimation information is additional information specific to an application program or content, and basically added to an application program or content. However, the power consumption estimation information may be stored in a place such as a cloud without being added to an application program or content.

For example, the characteristic or status of the user device 12 acquired through the communication unit 39 includes information such as the type and performance of the CPU 61 mounted in the user device 12, a remaining battery level, a free storage capacity, a free memory capacity, the type of a network line used by the communication unit 69, and age information of the user who uses the user device 12. The characteristic or status of the user device 12 includes a device type which is the type of a device mounted in the user device 12 and information representing power consumption according to a degree of resource use of each device type. In other words, this information is information representing a relation between a degree of resource use and power consumption (hereinafter referred to as "individual power consumption"). For example, the information represents a relation in which individual power consumption per network 1 Mpps is 0.3 W.

The acquiring unit 91 supplies the acquired characteristic or status of the application program or content and the characteristic or status of the user device 12 to the comparing unit 93. Further, the power consumption estimation information included in the acquired characteristic or status of an application program or content, and the device type and the information representing power consumption according to a degree of resource use of each device type which are included in the characteristic or status of the user device 12 are supplied to the power consumption estimating unit 92.

The power consumption estimating unit 92 estimates individual power consumption of each device type for each application program or each piece of content based on the power consumption estimation information and the device type and the information representing power consumption according to a degree of resource use of each device type included in the characteristic or status of the user device 12 and supplied from the acquiring unit 91. Then, the power consumption estimating unit 92 adds the individual power consumption of the respective device types for each application program or each piece of content, and estimates power consumption when each application program or each piece of content is used by the user device 12. The power consumption (hereinafter referred to as "estimated power consumption") estimated by the power consumption estimating unit 92 is supplied to the comparing unit 93.

The comparing unit 93 compares the characteristic or status of the application program or content supplied from the acquiring unit 91, the estimated power consumption supplied from the power consumption estimating unit 92, and the characteristic or status of the user device 12 supplied from the acquiring unit 91. Then, the comparing unit 93 determines whether or not a corresponding application program or content is usable in the user device 12. The comparing unit 93 supplies the determination result to the format supporting unit 94 and the presentation information generating unit 95.

The format supporting unit 94 converts a format of an application program or content determined to be unusable in the user device 12 by the comparing unit 93 into a format usable in the user device 12 so that the application program or content is supported by the user device 12. Alternatively, as an alternative to an application program or content determined to be unusable in the user device 12 by the comparing unit 93, the format supporting unit 94 may search for another application program or content having a function equivalent thereto from the storage unit 38 so that the application program or content is supported by the user device 12.

For example, the conversion of the format of the application program or content includes conversion between different CPU architectures such as ARM (a registered trademark), MIPS (a registered trademark), x86, and PowerPC (a registered trademark). Further, for example, the conversion of the format of the application program or content includes conversion between different CPU architectures of the same manufacturer (in the present instance, ARM Ltd.) such as Cortex M3 (a registered trademark), Cortex A5 (a registered trademark), Cortex A9 (a registered trademark), and Cortex A15 (a registered trademark). Further, for example, the conversion of the format of the application program or content includes conversion between different electronic book formats such as EPUB (a registered trademark), XMDF (a registered trademark), .book (a registered trademark), and AZW. Further, for example, the conversion of the format of the application program or content includes conversion between different multimedia content formats such as MP3, MPEG4, and AVI.

The presentation information generating unit 95 generates information to be presented to the user device 12 based on the determination result of the comparing unit 93 and the processing result of the format supporting unit 94. Specifically, the presentation information generating unit 95 generates the presentation information by listing information of application programs or content usable in the user device 12 together with the estimated power consumption. The presentation information generating unit 95 transmits the generated presentation information to the user device 12 through the communication unit 39.

The user device 12 receives and displays the presentation information. In other words, application programs or content usable by the user device 12 are displayed. The user operates the user device 12 and selects a desired application program or content from among the displayed application programs or content. The user device 12 transmits a download request of the selected application program or content to the service providing server 11.

Upon receiving the download request through the communication unit 39, the delivery control unit 96 delivers the application program or content selected by the user through the communication unit 39. Thus, in the user device 12, the application program or content selected by the user is downloaded and is used.

Further, at least some of the power consumption estimating unit 92, the comparing unit 93, the format supporting unit 94, and the presentation information generating unit 95 may be transferred to the user device 12.

In the above example, the power consumption estimating unit 92 estimates the estimated power consumption each time there is access by a predetermined user device 12. However, the power consumption estimating method is not limited to this example. For example, the power consumption estimated once may be stored in a predetermined place such as a cloud in association with each user device 12 (for example, each model number). In this case, when there is access by a predetermined user device 12, the power consumption estimating unit 92 reads the estimated power consumption associated with the corresponding user device 12 from the predetermined place. Thus, less time is taken for the power consumption estimating unit 92 to calculate the power consumption, and thus the processing speed can be improved.

[Functional Configuration Example of User Device]

Figure 6:
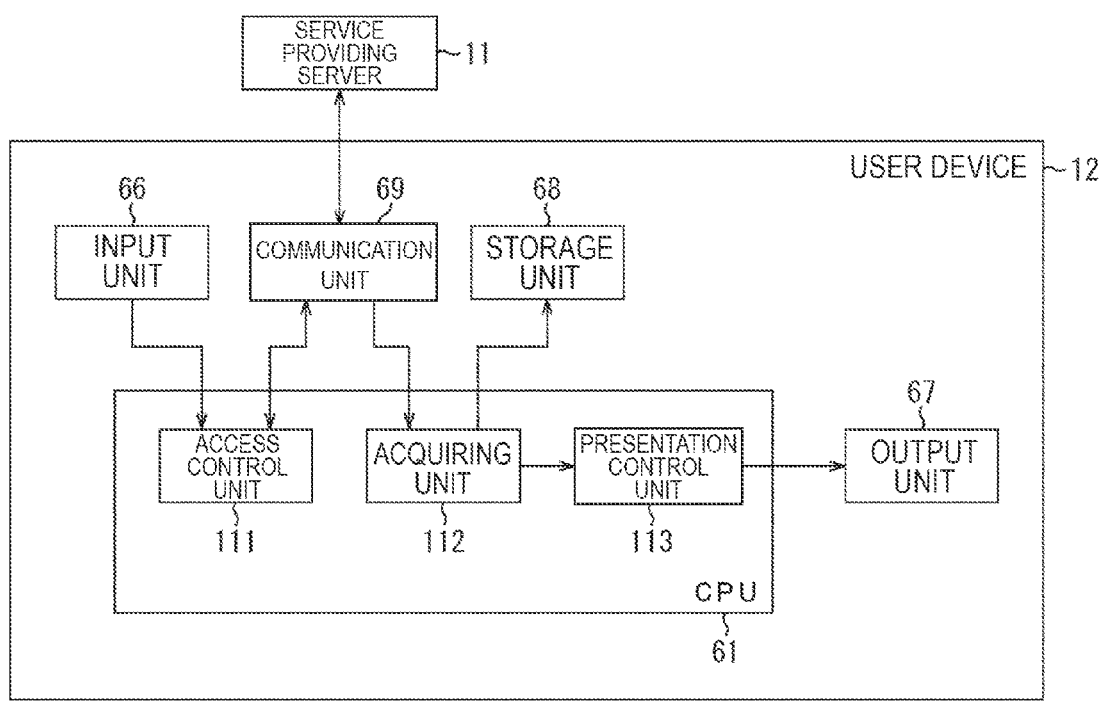
FIG. 6 is a block diagram illustrating a functional configuration example of a CPU of a user device.

FIG. 6 is a block diagram illustrating a functional configuration example of the CPU 61 of the user device 12 illustrated in FIG. 3.

The CPU 61 includes an access control unit 111, an acquiring unit 112, and a presentation control unit 113.

The access control unit 111 accesses the service providing server 11 through the communication unit 69 in response to the user's operation on the input unit 66.

The service providing server 11 receives the access from the user device 12 through control of the access control unit 111, causes the above-described functional blocks to operate and generates the presentation information, and transmits the presentation information to the user device 12.

The acquiring unit 112 acquires the presentation information from the service providing server 11 through the communication unit 69.

The presentation control unit 113 presents the presentation information acquired by the acquiring unit 112 such that the presentation information is displayed on the output unit 67.

The user operates the input unit 66 and selects a desired application program or content from among the application programs or content included in the presented presentation information. The access control unit 111 transmits the download request of the selected application program or content to the service providing server 11 through the communication unit 69.

The service providing server 11 receives the download request, and delivers the application program or content selected by the user.

The acquiring unit 112 acquires the application program or content delivered from the service providing server 11 through the communication unit 69, and causes the application program or content to be stored in the storage unit 68. In other words, the application program or content is downloaded from the service providing server 11.

[Application Program Presenting Process]

Figure 7:
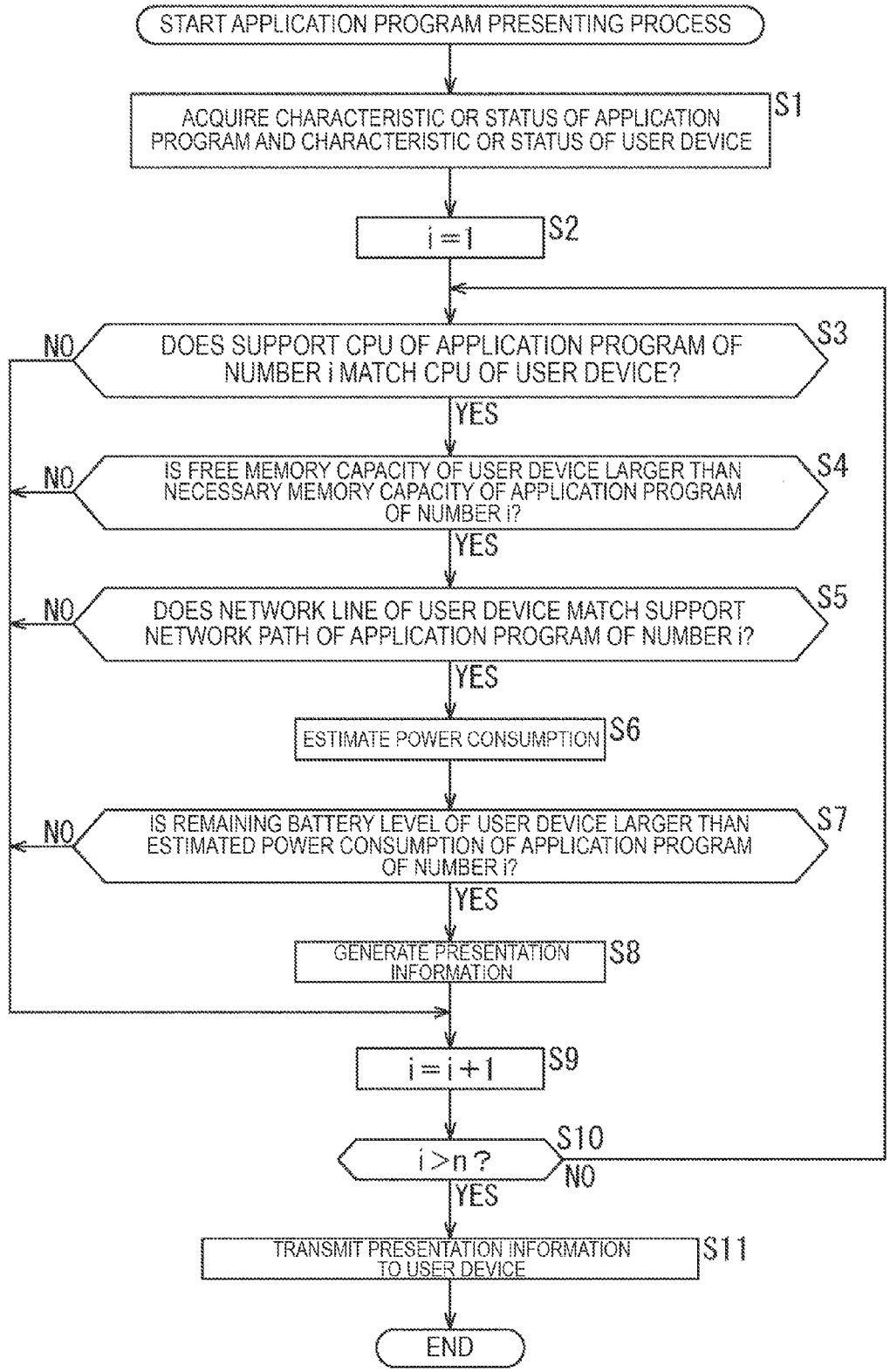
FIG. 7 is a flowchart for describing an example of the flow of an application program presenting process.

Next, a series of process (hereinafter referred to as an "application program presenting process") until the service providing server 11 presents an application program usable in the user device 12 will be described with reference to FIG. 7. FIG. 7 will be described in connection with an example in which the service providing server 11 executes the application program presenting process, but the process is basically similar even when the user device 12 executes the application program presenting process. Further, FIG. 7 will be described in connection with a series of processes until an application program is presented, but the process is basically similar even when content is presented.

FIG. 7 is a flowchart for describing an example of the flow of an application program presenting process.

The application program presenting process starts when access is received through control of the access control unit 111 of a predetermined user device 12.

In step S1, the acquiring unit 91 acquires characteristics or statuses of a plurality of application programs which can be delivered and a characteristic or status of the user device 12.

[Characteristic or Status of Application Program]

Here, a characteristic or status of an application program acquired by the acquiring unit 91 will be described with reference to FIG. 8.

Figure 8:
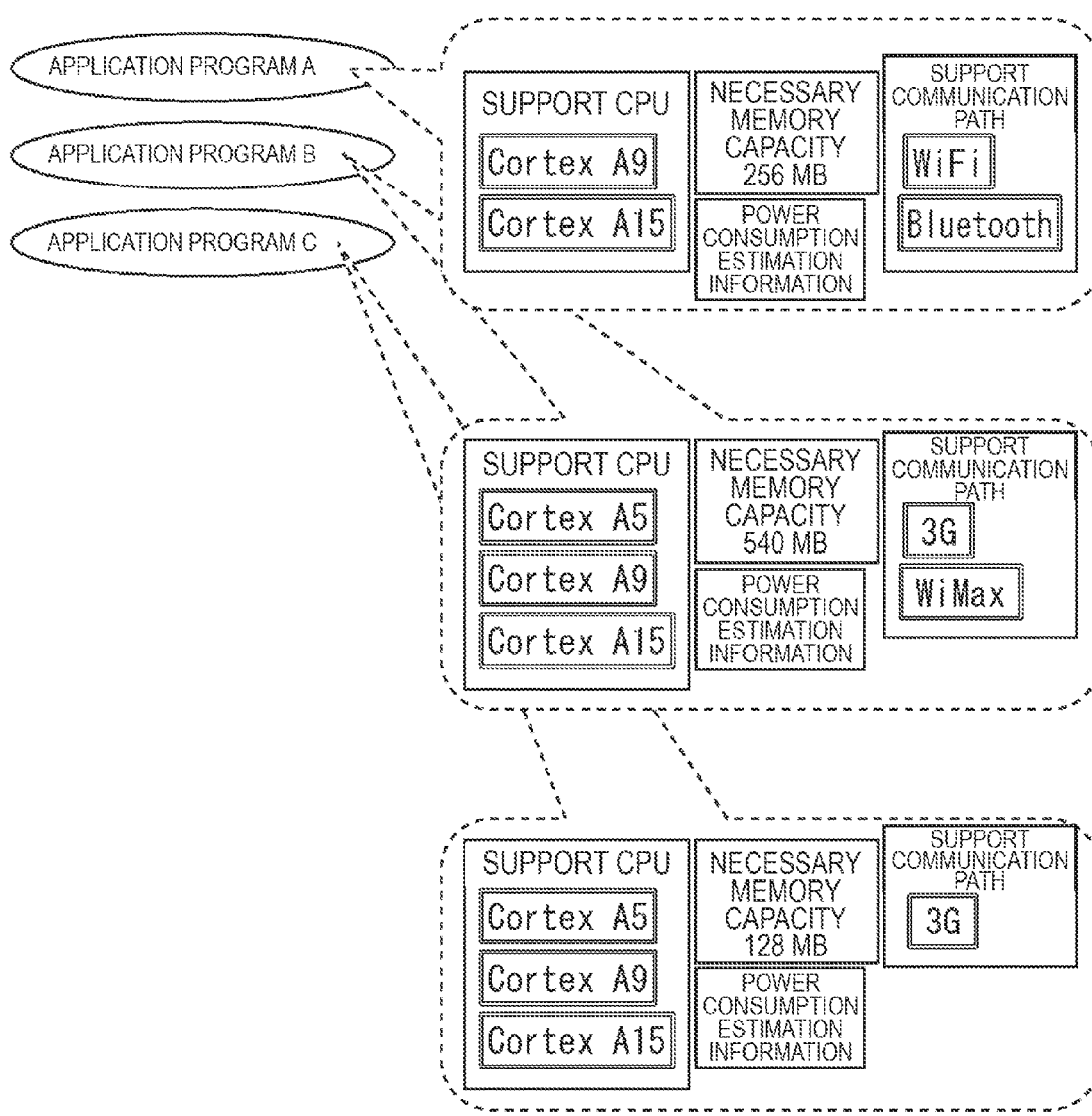
FIG. 8 is a diagram illustrating a characteristic or status of an application program.

FIG. 8 is a diagram illustrating a characteristic or status of an application program.

The application programs A, B, and C are assumed to be mailer application programs included in the mailer APM of FIG. 1. In the example of FIG. 8, for each of the application programs A, B, and C, a support CPU, a necessary memory capacity, a support communication path, and power consumption estimation information are acquired as a characteristic or status of an application program.

The support CPU refers to the type of CPU capable of executing an application program. The necessary memory capacity refers to a footprint when an application program is operated. The support communication path refers to a communication path used by an application program. The power consumption estimation information refers to information including a device type which is likely to be mounted in the user device 12 and an execution characteristic as illustrated in FIG. 5.

As illustrated in FIG. 8, a characteristic or status of the application program A, the support CPU is Cortex A9 (a registered trademark) and Cortex A15 (a registered trademark), the necessary memory capacity is 256 MB, and the support communication path is WiFi (a registered trademark) and Bluetooth (a registered trademark).

As a characteristic or status of the application program B, the support CPU is Cortex A5, Cortex A9, and Cortex A15, the necessary memory capacity is 540 MB, and the support communication path is 3G and WiMAX.

As a characteristic or status of the application program C, the support CPU is Cortex A5, Cortex A9, and Cortex A15, the necessary memory capacity is 128 MB, and the support communication path is 3G.

Next, the characteristic or status of the user device 12 acquired by the acquiring unit 91 will be described. The acquiring unit 91 acquires the type of the CPU 61 of the user device 12, a free memory capacity, a network line, a remaining battery level, a mounted device type, and information representing power consumption according to a degree of resource use of each device type as the characteristic or status of the user device 12.

When the characteristic or status of the application program illustrated in FIG. 8 and the characteristic or status of the user device 12 are acquired, the acquiring unit 91 supplies the characteristic or status of the application program and the characteristic or status of the user device 12 to the comparing unit 93. Further, the acquiring unit 91 supplies the power consumption estimating unit 92 with the power consumption estimation information included in the characteristic or status of the application program, and the device type and the information representing power consumption according to a degree of resource use of each device type which are included in the characteristic or status of the user device 12.

Referring back to FIG. 7, in step S2, the comparing unit 93 initializes a number i of an application program of a processing target to 1(one) (i=1). Here, in the process of step S1, n (n is an integer value of 1 or more) application programs acquired by the acquiring unit 91 are assumed to be designated by numbers 1 to n. In other words, each of 1 to n is sequentially set as the number i of the processing target, but the initial value 1 is set in the process of step S2.

In the example of FIG. 8, the three application programs A, B, and C are assumed to be acquired by the acquiring unit 91 and to be designated as numbers of 1, 2, and 3, respectively. In this case, in the process of step S2, the number i=1 is set so that the application program A is set as the processing target.

In step S3, the comparing unit 93 determines whether or not the support CPU of the application program of the number i matches the CPU of the user device 12.

Specifically, for example, when i is 1, it is determined whether or not Cortex A9 or Cortex A15 which is the support CPU of the application program A matches the CPU 61 mounted in the user device 12.

When the support CPU of the application program matches the CPU 61 of the user device 12, YES is determined in step S3, and the process proceeds to step S4.

In step S4, the comparing unit 93 determines whether or not the necessary memory capacity of the application program of the number i is larger than the free memory capacity of the user device 12.

Specifically, for example, when i is 1, it is determined whether or not the free memory capacity of the user device 12 is larger than 256 MB which is the necessary memory capacity of the application program A.

When the free memory capacity of the user device 12 is larger than the necessary memory capacity of the application program A, YES is determined in step S4, and the process proceeds to step S5.

In step S5, the comparing unit 93 determines whether or not the support communication path of the application program of the number i matches the network line of the user device 12.

Specifically, for example, when i is 1, it is determined whether or not WiFi or Bluetooth which is the support communication path of the application program A matches the network line mounted in the user device 12.

When the support communication path of the application program of the number i matches the network line mounted in the user device 12, YES is determined in step S5, and the process proceeds to step S6.

In step S6, the power consumption estimating unit 92 estimates power consumption when the application program of the number i is used by the user device 12. This estimation is performed based on the power consumption estimation information included in the characteristic or status of the application program of the number i, and the device type and the information representing power consumption according to a degree of resource use of each device type which are included in the characteristic or status of the user device 12. The estimated power consumption is supplied to the comparing unit 93.

In step S7, the comparing unit 93 determines whether or not the remaining battery level of the user device 12 is larger than the estimated power consumption of the application program of the number i.

When the remaining battery level of the user device 12 is larger than the estimated power consumption of the application program of the number i, YES is determined in step S7, and the process proceeds to step S8.

In step S8, the presentation information generating unit 95 generates (updates) the presentation information to include information of the application program of the number i.

When the process of step S8 is executed or when NO is determined in any one of steps S3, S4, S5, and S7, the process proceeds to step S9.

In step S9, the comparing unit 93 increases the number i of the processing target by 1 (i=i+1).

In step S10, the comparing unit 93 determines whether or not the number i of the processing target is larger than the total number n of application programs acquired in the process of step S1 (i> n).

Specifically, in the example of FIG. 8, when the process of step S8 is performed on the application program A of the number i=1 or when NO is determined in any one of steps S3, S4, S5, and S7, the number i becomes 2 in the process of step S9. In this case, since the number i=2 is less than the total number n=3, NO is determined in step S10, the process returns to step S3, and the subsequent process is repeated. In other words, the process of steps S3 to S9 is executed on the application program B of the number i=2.

In this case, the number i becomes 3 in the process of next step S9. In this case, since the number i=3 matches the total number n=3, NO is determined in step S10, the process returns to step S3, and the subsequent process is repeated. In other words, the process of steps S3 to S9 is executed on the application program C of the number i=3.

Further, the number i becomes 4 in the process of next step S9. In this case, since the number i=4 is larger than the total number n=3, YES is determined in step S10, and the process proceeds to step S11.

In step S11, the presentation information generating unit 95 transmits the presentation information to the user device 12 through the communication unit 39.

As a result, the application program presenting process ends. Meanwhile, the user device 12 receives and displays the presentation information. In other words, the application program usable by the user device 12 is displayed.

[Presentation Information]

Here, presentation information displayed on each user device 12 when user devices 12-X1, 12-Y1, and 12-Z1 access the service providing server 11 will be described.

FIG. 9 is a diagram illustrating presentation information in each user device 12.

As illustrated in FIG. 9A, the user device 12-X1 has a characteristic or status in which the type of the CPU 61 is Cortex A9, the free memory capacity is 720 MB, the network line is 3G and WiFi, and the remaining battery level is 0.5 W.

The application program A and the application program B are listed and displayed on the user device 12-X1 having the above characteristic or status as the presentation information together with the estimated power consumption thereof. At this time, the estimated power consumption of the application program A is 0.3 W, and the estimated power consumption of the application program B is 0.4 W.

As illustrated in FIG. 9B, the user device 12-Y1 has a characteristic or status in which the type of the CPU 61 is Cortex A5, the free memory capacity is 250 MB, the network line is 3G and WiFi, and the remaining battery level is 0.9 W.

The application program C is displayed on the user device 12-Y1 having the above characteristic or status as the presentation information together with the estimated power consumption thereof. At this time, the estimated power consumption of the application program C is 0.4 W.

As illustrated in FIG. 9C, the user device 12-Z1 has a characteristic or status in which the type of the CPU 61 is Cortex A15, the free memory capacity is 720 MB, the network line is WiMax and WiFi, and the remaining battery level is 0.8 W.

The application program A and the application program B are listed and displayed on the user device 12-Z1 having the above characteristic or status as the presentation information together with the estimated power consumption thereof. At this time, the estimated power consumption of the application program A is 0.5 W, and the estimated power consumption of the application program B is 0.9 W.

The presentation information of the application program B displayed on the user device 12-Z1 is displayed to be discriminated from other presentation information as indicated by a dotted line. In other words, since the estimated power consumption of the application program B is larger than the remaining battery level of the user device 12-Z1, it can be understood that it is difficult to use the application program B with the current remaining battery level of the user device 12. In this case, the presentation information may be displayed together with a message such as "Remaining battery level is not enough," or "Please charge." Further, the presentation information of the application program B may not be displayed.

As described above, an application program displayed as the presentation information differs according to the characteristic or status of the user device 12. In other words, a usable application program is displayed on each user device 12 according to the characteristic or status of the user device 12. Therefore, regardless of what application program presented by the service providing server 11 the user selects, the selected application can be used in the user device 12.

Further, even in the same application program, the displayed estimated power consumption differs according to the characteristic or status of the user device 12. Therefore, by selecting as an application program having low power consumption, power of the user device 12 can be saved.

In the process of FIG. 7, the support CPU, the necessary memory capacity, the support communication path, and the power consumption estimation information are compared with the characteristic or status of the user device 12 as the characteristic or status of an application program of the number i. However, the size of an application program included in the characteristic or status of an application program may also be compared with the free storage capacity included in the characteristic or status of the user device 12. Further, age information of the user who is allowed to use the application program included in the characteristic or status of an application program may be compared with age information of the user who uses the user device 12 included in the characteristic or status of the user device 12.

[Content Presenting Process]

Figure 10:
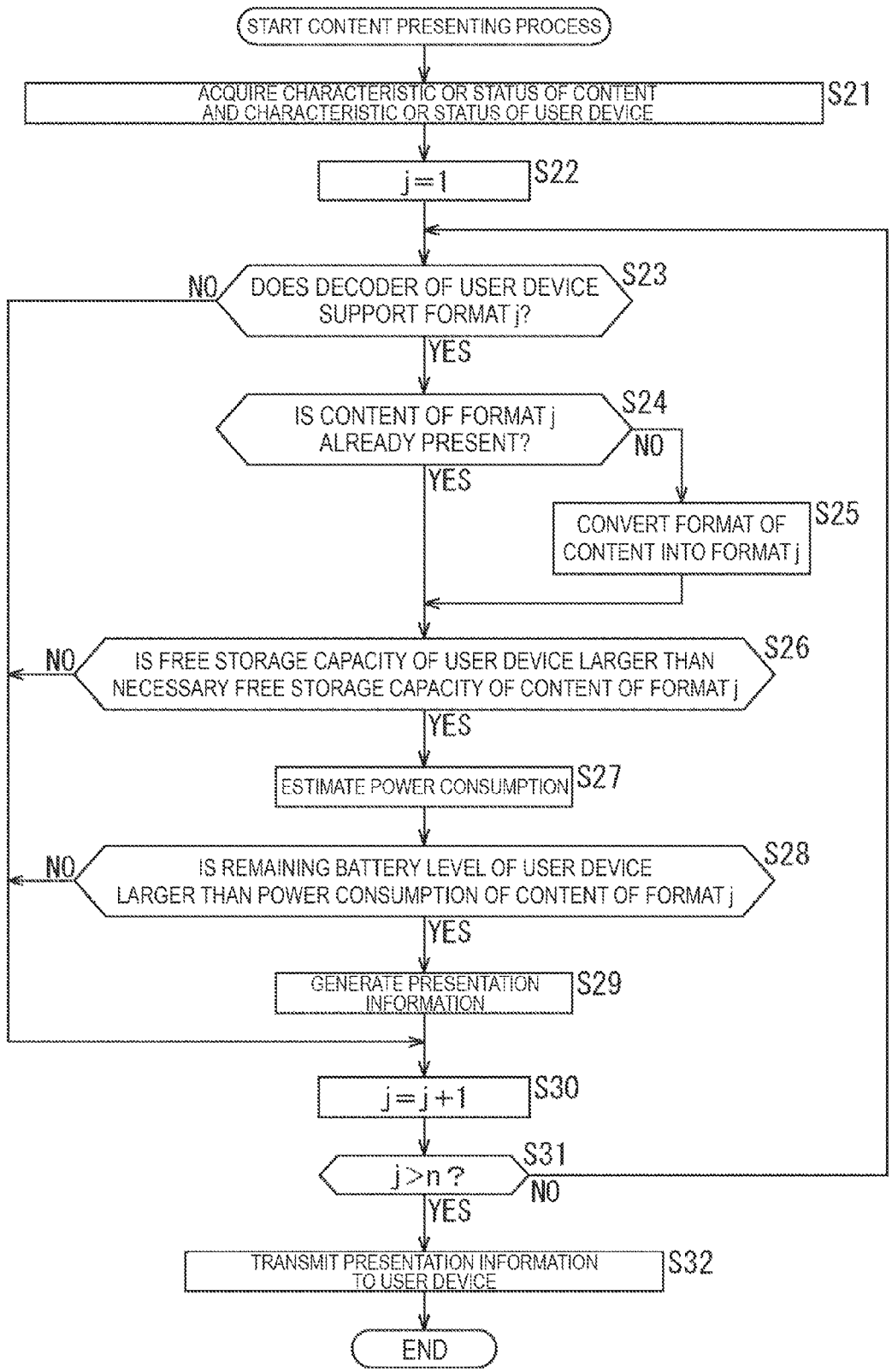
FIG. 10 is a flowchart for describing an example of the flow of a content presenting process.

Next, a series of processes (hereinafter referred to as a "content presenting process") until the service providing server 11 converts a format of content into a format usable in the user device 12 and presents corresponding content will be described with reference to FIG. 10. FIG. 10 will be described in connection with an example in which the service providing server 11 executes the content presenting process, but the process is basically similar even when the user device 12 executes the content presenting process. Further, FIG. 10 will be described in connection with a series of processes until a format of content is converted and corresponding content is presented, but the process is basically similar even when a format of a program is converted and a corresponding program is presented.

FIG. 10 is a flowchart for describing an example of the flow of a content presenting process.

The content presenting process starts when access is received through control of the access control unit 111 of a predetermined user device 12.

In step S21, the acquiring unit 91 acquires a characteristic or status of content which can be delivered and a characteristic or status of the user device 12.

[Characteristic or Status of Content]

Here, a characteristic or status of content acquired by the acquiring unit 91 will be described with reference to FIG. 11.

Figure 11:
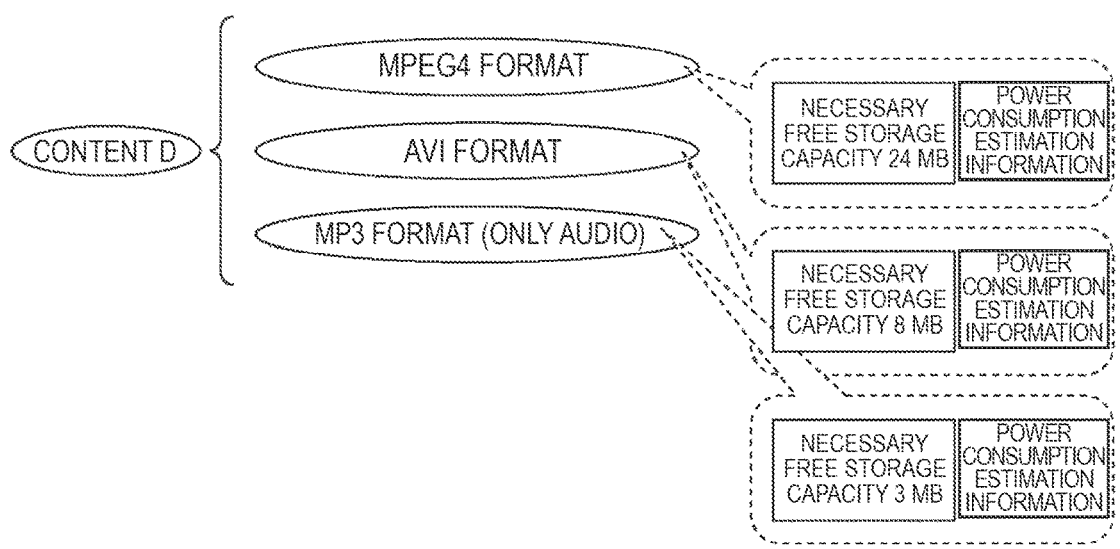
FIG. 11 is a diagram illustrating a characteristic or status of content.

FIG. 11 is a diagram illustrating a characteristic or status of content.

Content D is assumed to be video content included in the video content CM of FIG. 1. In the example of FIG. 11, for the content D, the necessary free storage capacity and the power consumption estimation information are acquired as a characteristic or status of content of the content D for each of a plurality of multimedia content formats such as the MPEG4 format, the AVI format, and the MP3 format.

As illustrated in FIG. 11, as the characteristic or status of the MPEG4 format of the content D, the necessary free storage capacity is 24 MB.

As the characteristic or status of the AVI format of the content D, the necessary free storage capacity is 8 MB.

As the characteristic or status of the MP3 format of the content D, the necessary free storage capacity is 3 MB.

Next, the characteristic or status of the user device 12 acquired by the acquiring unit 91 will be described. The acquiring unit 91 acquires the free storage capacity of the user device 12, a mounted decoder, a remaining battery level, a mounted device type, and information representing power consumption according to a degree of resource use of each device type as the characteristic or status of the user device 12.

Upon acquiring the characteristic or status of the content D illustrated in FIG. 11 and the characteristic or status of the user device 12, the acquiring unit 91 supplies the comparing unit 93 with the characteristic or status of the content D and the characteristic or status of the user device 12. Further, the acquiring unit 91 supplies the power consumption estimating unit 92 with the power consumption estimation information included in the characteristic or status of the content, and the device type and the information representing power consumption according to a degree of resource use of each device type which are included in the characteristic or status of the user device 12.

Referring back to FIG. 10, in step S2, the comparing unit 93 initializes a format j of a processing target of content as an initial value 1 (j=1). Here, in the process of step S1, n (n is an integer value of 1 or more) multimedia content formats of content acquired by the acquiring unit 91 are assumed to be designated as formats 1 to n, in descending order of necessary free storage capacity. In other words, each of 1 to n is set as the format j of the processing target, but the initial value 1 is set in the process of step S2.

In the example of FIG. 11, three multimedia content formats of the content D, that is, the MPEG4 format, the AVI format, and the MP3 format, are assumed to be acquired by the acquiring unit 91 and to be designated as formats of 1, 2, and 3, respectively. In this case, in the process of step S2, the format j=1 is set so that the MPEG4 format is set as the processing target.

In step S3, the comparing unit 93 determines whether or not the decoder of the user device 12 supports the format j.

Specifically, for example, when j is 1, it is determined whether or not the decoder mounted in the user device 12 supports the MPEG4 format.

When the decoder of the user device 12 supports the format j, YES is determined in step S23, and the process proceeds to step S24.

In step S24, the comparing unit 93 determines whether or not content of the format j is already presented in the storage unit 38 of the service providing server 11.

Specifically, for example, when j is 1, it is determined that the content D of the MPEG4 format is already present in the storage unit 38 of the service providing server 11.

When the content of the format j is presented in the storage unit 38, YES is determined in step S24, and the process proceeds to step S26. The process of step S26 and subsequent steps will be described later.

However, when the content of the format j is not present in the storage unit 38, NO is determined in step S24, and the process proceeds to step S25.

In step S25, the format supporting unit 94 converts a format of content into the format j.

Specifically, for example, when j is 1, the format supporting unit 94 converts a format of the content D into the MPEG4 format.

In step S26, the comparing unit 93 determines whether or not the free storage capacity of the user device 12 is larger than the necessary free storage capacity of the content of the format j.

Specifically, for example, when j is 1, it is determined whether or not the free storage capacity of the user device 12 is larger than 24 MB which is the necessary free storage capacity of the content D of the MPEG4 format.

When the free storage capacity of the user device 12 is larger than the necessary free storage capacity of the content D of the MPEG4 format, YES is determined in step S26, and the process proceeds to step S27.

In step S27, the power consumption estimating unit 92 estimates power consumption when the content of the format j is used by the user device 12 based on the power consumption estimation information included in the characteristic or status of the content of the format j, and the device type and the information representing power consumption according to a degree of resource use of each device type which are included in the characteristic or status of the user device 12. The estimated power consumption is supplied to the comparing unit 93.

In step S28, the comparing unit 93 determines whether or not the remaining battery level of the user device 12 is larger than the estimated power consumption of the content of the format j.

When the remaining battery level of the user device 12 is larger than the estimated power consumption of the content of the format j, YES is determined in step S28, and the process proceeds to step S29.

In step S29, the presentation information generating unit 95 generates (updates) the presentation information to include the information of the content of the format j.

When the process of step S29 is executed or when NO is determined in any one of steps S23, S26, and S28, the process proceeds to step S30.

In step S30, the comparing unit 93 increases the format j of the processing target by 1 (j=j+1).

In step S31, the comparing unit 93 determines whether or not the format j of the processing target is larger than the total number n of multimedia content formats of the content acquired in the process of step S21 (j> n).

Specifically, in the example of FIG. 11, when the process of step S29 is performed on the content D of the MPEG4 format of the format j=1 or when NO is determined in any one of steps S23, S26, and S28, the format j becomes 2 in the process of step S30. In this case, since the format j=2 is less than the total number n=3, NO is determined in step S31, the process returns to step S23, and the subsequent process is repeated. In other words, the process of steps S23 to S30 is executed on the content D of the AVI format of the format j=2.

In this case, the format j becomes 3 in the process of the next step S30. In this case, since the format j=3 matches the total number n=3, NO is determined in step S31, the process returns to step S23, and the subsequent process is repeated. In the words, the process of steps S23 to S30 is executed on the content D of the MP3 format of the format j=3.

Further, the format j becomes 4 in the process of next step S30. In this case, since the format j=4 is larger than the total number n=3, YES is determined in step S31, and the process proceeds to step S32.

In step S32, the presentation information generating unit 95 transmits the presentation information to the user device 12 through the communication unit 39.

As a result, the content presenting process ends. Meanwhile, the user device 12 receives and displays the presentation information. In other words, content of a format usable by the user device 12 is displayed.

[Presentation Information]

Here, presentation information displayed on each user device 12 when user devices 12-X2, 12-Y2, and 12-Z2 access the service providing server 11 will be described.

Figure 12:
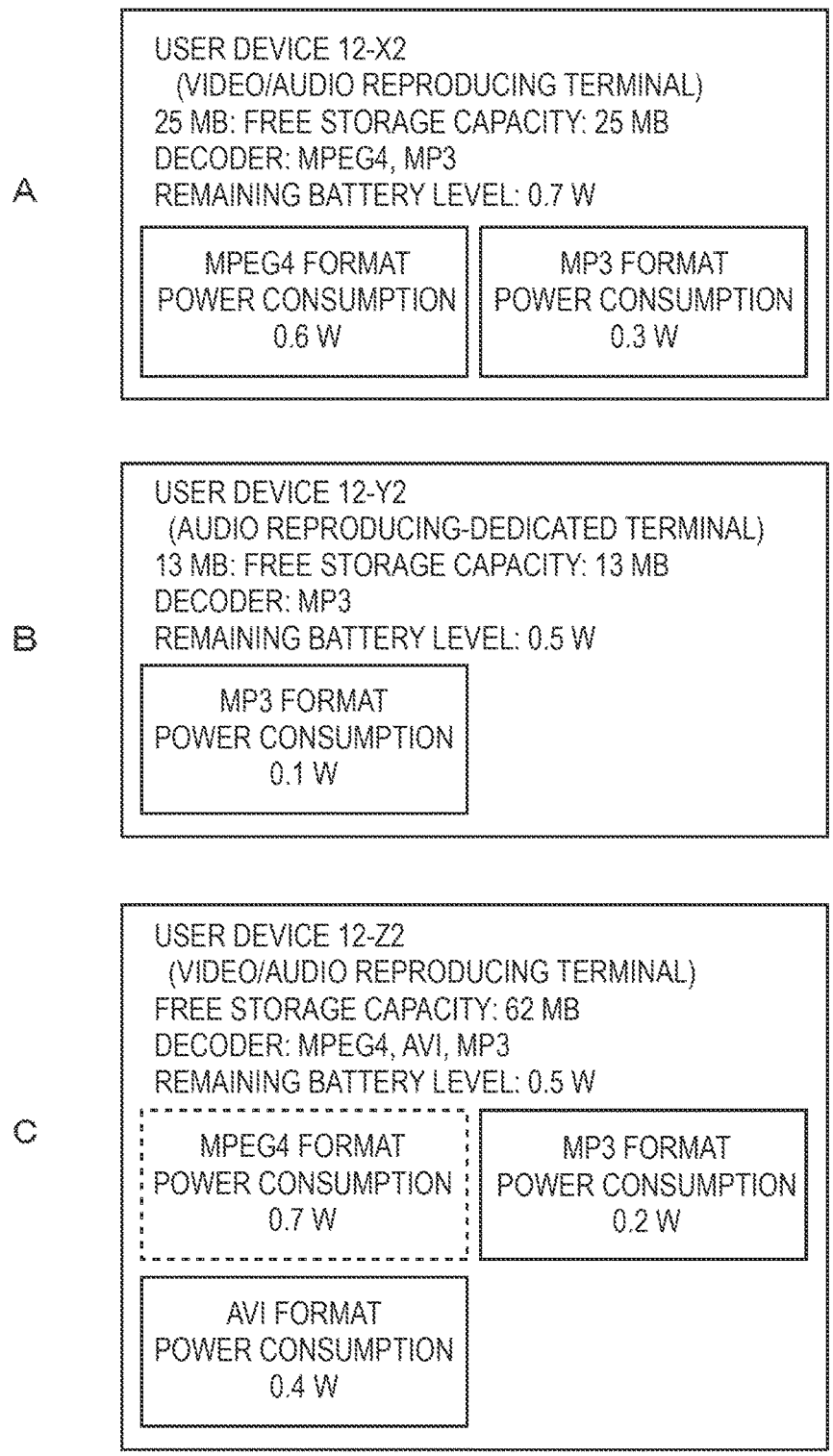
FIG. 12 is a diagram illustrating presentation information in a user device.

FIG. 12 is a diagram illustrating presentation information in each user device 12.

As illustrated in FIG. 12A, the user device 12-X2 has a characteristic or status in which the free storage capacity is 25 MB, the decoder supports the MPEG4 format and the MP3 format, and the remaining battery level is 0.7 W.

The content D of the MPEG4 format and the content D of the MP3 format are listed and displayed on the user device 12-X2 having the characteristic or status as the presentation information together with the estimated power consumption thereof. At this time, the estimated power consumption of the content D of the MPEG4 format is 0.6 W, and the estimated power consumption of the content D of the MP3 format is 0.3 W.

As illustrated in FIG. 12B, the user device 12-Y2 has a characteristic or status in which the free storage capacity is 13 MB, the decoder supports the MP3 format, and the remaining battery level is 0.5 W.

The content D of the MP3 format is displayed on the user device 12-Y2 having the above characteristic or status as the presentation information together with the estimated power consumption thereof. At this time, the estimated power consumption of the content D of the MP3 format is 0.1 W.

As illustrated in FIG. 12C, the user device 12-Z2 has a characteristic or status in which the free storage capacity is 62 MB, the decoder supports the MPEG4 format, the AVI format, and the MP3 format, and the remaining battery level is 0.5 W.

The content D of the MPEG4 format, the content D of the AVI format, and the content D of the MP3 format are listed and displayed on the user device 12-Z2 having the above characteristic or status as the presentation information together with the estimated power consumption thereof. At this time, the estimated power consumption of the content D of the MPEG4 format is 0.7 W, the estimated power consumption of the content D of the AVI format is 0.4 W, and the estimated power consumption of the content D of the MP3 format is 0.2 W.

The presentation information of the content D of the MPEG4 format displayed on the user device 12-Z2 is displayed to be discriminated from other presentation information as indicated by a dotted line. In other words, since the estimated power consumption of the content D of the MPEG4 format is larger than the remaining battery level of the user device 12-Z2, it can be understood that it is difficult to use the application program B with the current remaining battery level of the user device 12. In this case, the presentation information may be displayed together with a message such as "Remaining battery level is not enough," or "Please charge." Further, the presentation information of the content D of the MPEG4 format may not be displayed.

As described above, a format of content displayed as the presentation information differs according to the characteristic or status of the user device 12. In other words, a usable format of content is displayed on each user device 12 according to the characteristic or status of the user device 12. Therefore, even when the user selects any format of content presented by the service providing server 11, the content can be used in the user device 12.

Further, even in the same content, the displayed estimation format and the estimated power consumption differ according to the characteristic or status of the user device 12. Therefore, by selecting content of a format having low power consumption, power of the user device 12 can be saved.

[Application to Program of Present Technology]

A series of processes can be executed by hardware or executed by software. When a series of processes are executed by software, a program configuring the software is installed in a computer. Here, examples of the computer include a computer integrated into dedicated hardware or a general-purpose personal computer in which various kinds of programs are installed to execute various kinds of functions.

For example, in the service providing server 11 of FIG. 2 or the user device 12 of FIG. 3 which is an example of the computer, for example, a series of processes described above are performed such that the CPU 31 of FIG. 2 or the CPU 61 of FIG. 3 loads a program stored in the storage unit 38 of FIG. 2 or the storage unit 68 of FIG. 3 in the RAM 33 of FIG. 2 or the RAM 63 of FIG. 3 through the 10 interface 35 of FIG. 2 or the 10 interface 65 of FIG. 3 and the bus 34 of FIG. 2 or the bus 64 of FIG. 3, and executes the program.

For example, the program executed by the computer may be provided in a form in which the program is recorded in the removable medium 41 of FIG. 2 or a removable medium 71 of FIG. 3 serving as a package medium. Further, the program may be provided through a wired or wireless transmission medium such as a local area network (LAN), the Internet, or digital satellite broadcasting.

In the computer, the removable medium 41 of FIG. 2 or the removable medium 71 of FIG. 3 may be mounted in the drive 40 of FIG. 2 or the drive 70 of FIG. 3, and the program may be installed in the storage unit 38 of FIG. 2 or the storage unit 68 of FIG. 3 through the 10 interface 35 of FIG. 2 or the 10 interface 65 of FIG. 3. Alternatively, the program may be received by the communication unit 39 of FIG. 2 or the communication unit 69 of FIG. 3 through a wired or wireless transmission medium, and installed in the storage unit 38 of FIG. 2 or the storage unit 68 of FIG. 3. In addition, the program may be installed in either of the ROM 32 of FIG. 2 and the ROM 62 of FIG. 3 or either of the storage unit 38 of FIG. 2 and the storage unit 68 of FIG. 3 in advance.

Further, the program executed by the computer may be a program that performs the process in time series according to the order described in this disclosure or may be a program that performs the process in parallel or at a necessary timing such as when called.

The exemplary embodiment of the present technology is not limited to the above embodiment, and various changes can be made within a range not departing from the gist of the present technology.

For example, the present technology may have a cloud computing configuration in which a single process is shared by a plurality of devices via a network and processed jointly by a plurality of devices.

Further, steps described in the above flowcharts are executed by a single device but may be shared and executed by a plurality of devices.

In addition, when a plurality of processes are included in a single step, the plurality of processes included in the single step executed by a single device but may be shared and executed by a plurality of devices.

Additionally, the present technology may also be configured as below.

(1) An information processing apparatus, including:
an acquiring unit that acquires first information representing at least one of a characteristic and a status of delivery data and second information representing at least one of a characteristic and a status of a terminal in which the delivery data is usable;

a comparing unit that compares the first information and the second information acquired by the acquiring unit, and determines whether or not the delivery data is usable in the terminal; and a presentation information generating unit that generates information of the delivery data usable in the terminal based on a determination result of the comparing unit as presentation information.

(2) The information processing apparatus according to (1), wherein the delivery data includes at least one of an application program and content.

(3) The information processing apparatus according to (1) or (2), wherein the first information acquired by the acquiring unit includes power consumption estimation information used to estimate power consumption when the delivery data is used in the terminal, and the information processing apparatus further comprises a power consumption estimating unit that estimates power consumption when the delivery data is used in the terminal based on the power consumption estimation information included in the first information acquired by the acquiring unit and the second information.

(4) The information processing apparatus according to any one of (1) to (3), wherein the power consumption estimation information includes a type of a device which is likely to be mounted in the terminal and use information representing a degree of resource use of the device of the type when the delivery data is used, the second information includes a type of a device mounted in the terminal and relation information representing a relation between the degree of resource use of the device of the type and individual power consumption, and the power consumption estimating unit estimates the power consumption by estimating the individual power consumption consumed in each of the devices of the type mounted in the terminal based on the use information and the relation information and adding the individual power consumption of the respective devices of the type.

(5) The information processing apparatus according to any one of (1) to (4), wherein the comparing unit compares the power consumption estimated by the power consumption estimating unit with a remaining battery level included in the second information, and determines whether or not the delivery data is usable in the terminal using at least a comparison result.

(6) The information processing apparatus according to any one of (1) to (5), wherein the comparing unit compares a type of a CPU capable of executing the delivery data included in the first information with a type of a CPU included in the second information, and determines whether or not the delivery data is usable in the terminal using at least a comparison result.

(7) The information processing apparatus according to any one of (1) to (6), wherein the comparing unit compares a footprint at the time of operation when the delivery data is used which is included in the first information with a free memory capacity included in the second information, and determines whether or not the delivery data is usable in the terminal using at least a comparison result.

(8) The information processing apparatus according to any one of (1) to (7), wherein the comparing unit compares a communication path used by the delivery data which is included in the first information with a network line included in the second information, and determines whether or not the delivery data is usable in the terminal using at least a comparison result.

(9) The information processing apparatus according to any one of (1) to (8), wherein the presentation information generating unit generates information of the delivery data usable in the terminal and information including the power consumption estimated by the power consumption estimating unit as the presentation information.

(10) The information processing apparatus according to any one of (1) to (8), wherein the presentation information is information of a list form.

(11) The information processing apparatus according to any one of (1) to (10), further comprising, a format supporting unit that converts a format of the delivery data determined to be unusable in the terminal by the comparing unit into a format usable in the terminal so that the delivery data is supported by the terminal, wherein the presentation information generating unit generates the presentation information including information of the delivery data whose format is converted by the format supporting unit.

(12) The information processing apparatus according to any one of (1) to (11), further comprising, a format supporting unit that searches for another application program or content as an alternative to the delivery data determined to be unusable in the terminal by the comparing unit, wherein the presentation information generating unit generates the presentation information including information of the other application program or content searched as the alternative to the delivery data by the format supporting unit.

(13) An information processing system including a server capable of delivering an application program and content and a user terminal using a target delivered from the server from the application program and the content, the information processing system including:

an acquiring unit that acquires first information representing at least one of a characteristic and a status of delivery data and second information representing at least one of a characteristic and a status of a terminal in which the delivery data is usable when at least one of the application program and the content is set as the delivery data in the server;

a comparing unit that compares the first information and the second information acquired by the acquiring unit, and determines whether or not the delivery data is usable in the terminal; and a presentation information generating unit that generates information of the delivery data usable in the terminal based on a determination result of the comparing unit as presentation information.

The present technology can be widely applied to an information processing apparatus used in fields of services of providing an application program or content.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-100680 filed in the Japan Patent Office on Apr. 26, 2012, the entire content of which is hereby incorporated by reference.

What is claimed is:

1. A server, comprising:
   a memory
   a first central processing unit (CPU) configured to:
   acquire first information representing at least one of a characteristic or a status of delivery data and acquire second information representing at least one of a characteristic or a status of a terminal in which the delivery data might be usable;
   wherein the first information includes use information representing a degree of resource use of each type of device which is mounted in the terminal based on usage of the delivery data in the terminal;
   compare at least one communication path used by the delivery data during the usage of the delivery data in the terminal with a network line of the terminal included in the second information,
   wherein the delivery data is included in the first information;
   wherein the second information includes a type of a device mounted in the terminal and relation information representing a relation between the degree of resource use of the device of the type and individual power consumption; and
   estimate the information of power consumption by estimation of the individual power consumption consumed in each of the devices of the type mounted in the terminal based on the use information, and the relation information and addition of the individual power consumption of the respective devices of the type;
   determine whether the delivery data is usable in the terminal based on the comparison of the at least one communication path used by the delivery data with the network line of the network;
   generate presentation information comprising: information of the delivery data usable in the terminal based on the determination that the delivery data is usable in the terminal, and
   information of power consumption estimated based on the degree of resource use of each device mounted in the terminal based on the usage of the delivery data in the terminal; and
   transmit the presentation information to the terminal.

2. The server according to claim 1, wherein the delivery data includes at least one of a first application program or first content.

3. The server according to claim 2,
   wherein the first CPU is further configured to:
   search for at least one of a second application program or second content as an alternative to the delivery data determined to be unusable in the terminal, and
   generate the presentation information including information of the second application program or the second content searched as the alternative to the delivery data.

4. The server according to claim 1, wherein the first CPU is further configured to: compare the estimated information of power consumption with a remaining battery level included in the second information, and determine whether the delivery data is usable in the terminal based on the comparison of the estimated information of power consumption with the remaining battery level.

5. The server according to claim 1,
   wherein the first CPU is further configured to:
   compare a type of a second CPU that is capable to execute the delivery data included in the first information with a type of a third CPU included in the second information, and
   determine whether the delivery data is usable in the terminal based on the comparison of the type of the second CPU included in the first information with the type of the third CPU included in the second information.

6. The server according to claim 1,
   wherein the first CPU is further configured to:
   compare a footprint at a time of operation based on the usage of the delivery data which is included in the first information with a free memory capacity included in the second information, and
   determine whether the delivery data is usable in the terminal based on the comparison of the footprint with the free memory capacity.

7. The server according to claim 1, wherein the presentation information is information of a list form.

8. An information processing method, the method comprising:
   in a central processing unit (CPU);
   acquiring first information representing at least one of a characteristic or a status of delivery data and acquiring second information representing at least one of a characteristic or a status of a terminal in which the delivery data might be usable,
   wherein the first information includes use information representing a degree of resource use of each type of device which is mounted in the terminal based on the usage of the delivery data in the terminal;
   comparing at least one communication path used by of the delivery data during the usage of the delivery data in the terminal with a network line of the terminal included in the second information,
   wherein the delivery data is included in the first information;
   wherein the second information includes a type of a device mounted in the terminal and relation information representing a relation between the degree of resource use of the device of the type and individual power consumption; and
   estimating the information of power consumption by estimation of the individual power consumption consumed in each of the devices of the type mounted in the terminal based on the use information, and the relation information and addition of the individual power consumption of the respective devices of the type;
   determining whether the delivery data is usable in the terminal based on the comparison of the at least one communication path used by the delivery data with the network line of the terminal;
   generating presentation information comprising: information of the delivery data usable in the terminal based on the determination that the delivery data is usable in the terminal, and
   information of power consumption estimated based on the degree of resource use of each device mounted in the terminal based on the usage of the delivery data in the terminal; and
   transmitting the presentation information to the terminal.

9. An information processing method, the method comprising:
   in a central processing unit (CPU):
   acquiring first information representing at least one of a characteristic or a status of delivery data and acquiring second information representing at least one of a characteristic or a status of a terminal in which the delivery data might be usable,
wherein the first information includes use information representing a degree of resource use of each type of device which is mounted in the terminal based on usage of the delivery data the terminal;
comparing at least one communication path used by of the delivery data during the usage of the delivery data in the terminal with a network line of the terminal included in the second information,
wherein the delivery data is included in the first information;
determining whether the delivery data is usable in the terminal based on the comparison of the at least one communication path used by the delivery data with the network line of the terminal;
generating presentation information comprising:
information of the delivery data usable in the terminal based on the determination that the delivery data is usable in the terminal, and
information of power consumption estimated based on the degree of resource use of each device mounted in the terminal based on the usage of the delivery data in the terminal; and
transmitting the presentation information to the terminal.

10. The information processing method according to claim 9, wherein the delivery data includes at least one of an application program or content.

11. A non-transitory computer-readable medium having stored thereon, computer-executable instructions which when executed by a computer cause the computer to execute operations, the operations comprising:
acquiring first information representing at least one of a characteristic or a status of delivery data and second information representing at least one of a characteristic or a status of a terminal in which the delivery data might be usable,
wherein the first information includes use information representing a degree of resource use of each type of device which is mounted in the terminal based on usage of the delivery data in the terminal;
comparing at least one communication path used by the delivery data during the usage of the delivery data in the terminal with a network line of the terminal included in the second information,
wherein the delivery data is included in the first information;
wherein the second information includes a type of a device mounted in the terminal and relation information representing a relation between the degree of resource use of the device of the type and individual power consumption; and
estimating the information of power consumption by estimation of the individual power consumption consumed in each of the devices of the type mounted in the terminal based on the use information, and the relation information and addition of the individual power consumption of the respective devices of the type;
determining whether the delivery data is usable in the terminal based on the comparison of the at least one communication path used by the delivery data with the network line of the terminal;
generating presentation information comprising: information of the delivery data usable in the terminal based on the determination that the delivery data is usable in the terminal, and
information of power consumption estimated based on the degree of resource use of each device mounted in the terminal based on the usage of the delivery data in the terminal; and
transmitting the presentation information to the terminal.

12. The non-transitory computer-readable medium according to claim 11, wherein the delivery data includes at least one of an application program or content.

13. An information processing system including a server capable to deliver an application program and content and a user terminal which uses a target delivered from the server from the application program and the content, the server comprising: a memory; a central processing unit (CPU) configured to:
acquire first information representing at least one of a characteristic or a status of delivery data and acquire second information representing at least one of a characteristic or a status of a terminal in which the delivery data might be usable based on at least one of the application program or the content being set as the delivery data in the server;
wherein the first information includes use information representing a degree of resource use of each type of device which is mounted in the terminal based on usage of the delivery data in the terminal;
compare at least one communication path used by the delivery data during the usage of the delivery data in the terminal with a network line of the terminal included in the second information,
wherein the delivery data is included in the first information;
wherein the second information includes a type of a device mounted in the terminal and relation information representing a relation between the degree of resource use of the device of the type and individual power consumption; and
estimate the information of power consumption by estimation of the individual power consumption consumed in each of the devices of the type mounted in the terminal based on the use information, and the relation information and addition of the individual power consumption of the respective devices of the type;
determine whether the delivery data is usable in the terminal based on the comparison of the at least one communication path used by the delivery data with the network line of the network;
generate presentation information comprising: information of the delivery data usable in the terminal based on the determination that the delivery data is usable in the terminal, and
information of power consumption estimated based on the degree of resource use of each device mounted in the terminal based on the usage of the delivery data in the terminal; and
transmit the presentation information to the terminal.

* * * * *